United States Patent

Martin

[15] 3,703,616

[45] Nov. 21, 1972

[54] GAUGE ACTUATED CIRCUIT CONTROL UNIT

[72] Inventor: Clyde J. Martin, Cincinnati, Ohio

[73] Assignee: Martin Industries, Inc., Cincinnati, Ohio

[22] Filed: March 18, 1970

[21] Appl. No.: 20,735

[52] U.S. Cl. ................... 200/56 R, 73/389, 73/419
[51] Int. Cl. ...................... G01d 13/26, G01l 19/06
[58] Field of Search ....... 73/388 R, 419, 389; 92/5 R; 200/82 C, 56 R, 153 LA, 61.7 L, 49, 82 R, 81 R, 81.4, 152 LA

[56] References Cited

UNITED STATES PATENTS

| | | |
|---|---|---|
| 2,891,120 | 6/1959 | Saholt ......................... 200/82 |
| 2,437,440 | 3/1948 | Rigden ........................ 200/56 |
| 3,207,871 | 9/1965 | Dally ........................... 200/82 |
| 1,876,878 | 9/1932 | Douglas ............ 200/153.12 X |
| 2,903,888 | 9/1959 | Gföll ........................ 73/419 X |
| 2,418,508 | 4/1947 | Goepfrich ................ 200/82 C |
| 3,576,529 | 4/1971 | Garrison .............. 200/153 LA |
| 3,145,275 | 8/1964 | Gildart ................ 200/153 LA |

Primary Examiner—Louis R. Prince
Assistant Examiner—Daniel M. Yasich
Attorney—J. Warren Kinney, Jr.

[57] ABSTRACT

The control unit comprises a base carrying an upstanding pressure gauge upon which is mounted a reciprocative conical control head arranged to actuate switches, contactors, circuit breakers and other electrical components clustered about the gauge, said components being adjustable for selective sequential actuation by the control head.

15 Claims, 8 Drawing Figures

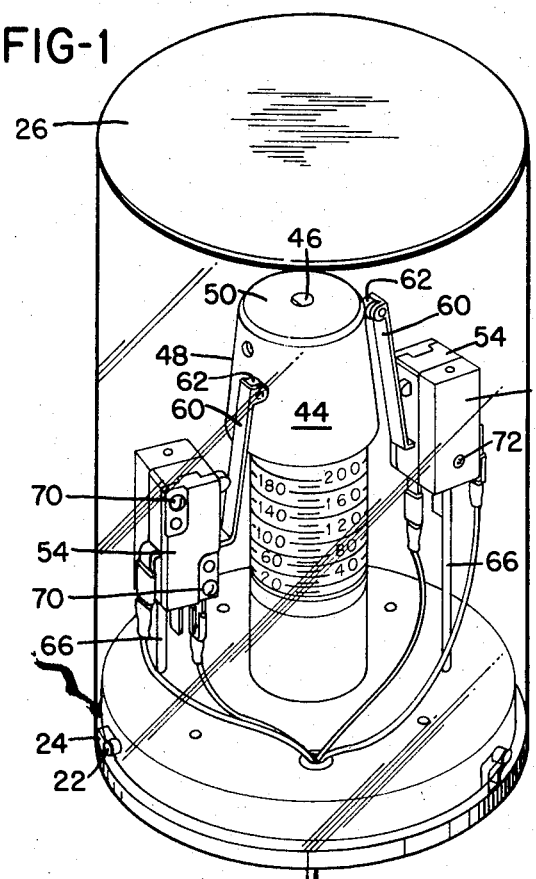
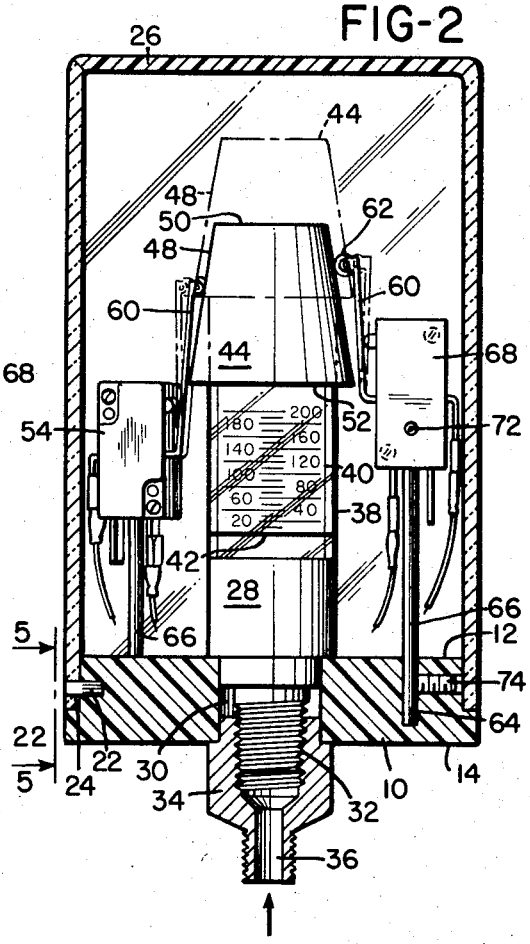
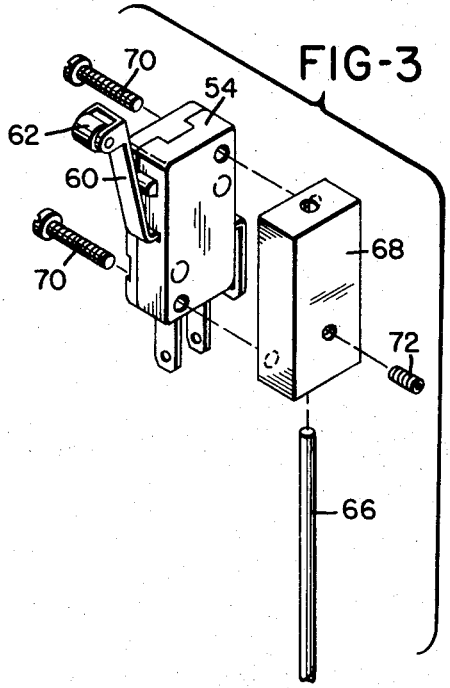
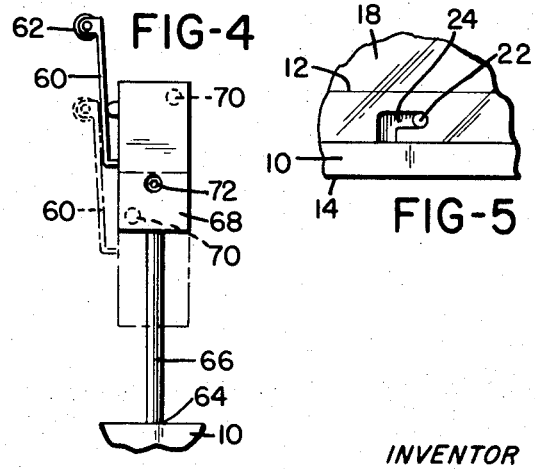
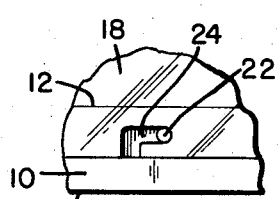
INVENTOR
CLYDE J. MARTIN
BY J. Warren Kinney Jr.
ATTORNEY INVENTOR
CLYDE J. MARTIN
BY J. Warren Kinney Jr.
ATTORNEY

GAUGE ACTUATED CIRCUIT CONTROL UNIT

This invention relates to a gauge actuated circuit control unit, particularly as related to electric circuitry.

The control unit may comprise a base and a protective cover or hood defining a chamber, in which chamber is located a fluid pressure gauge and one or more electric circuit controllers including when necessary, other components such as terminal blocks, circuit breakers, indicators, alarms and the like. The pressure gauge includes a movable part or head responsive in its movements to changes of pressure within the gauge body, and such movements of the gauge head are utilized to actuate the unit components. The cover of the unit preferable is detachably mounted upon the base, and may be formed of transparent or opaque materials, as desired.

An object of the invention is to provide a gauge actuated circuit control unit which is simple, inexpensive, durable, and convenient in its application.

Another object of the invention is to provide a unit of the character stated, in which the components are actuated with precision, and in such manner as to greatly minimize wear and shock, with resultant freedom from servicing expense.

A further object is to provide in a unit of the character stated, simple and effective means for making adjustments in time periods and operating sequences of the unit components, as well as effecting replacements or substitutions of components.

Another object of the invention is to provide a unit of the character referred to which is compact, light of weight, and capable of being placed in service with ease and despatch, thereby to effect substantial savings of time and labor.

The foregoing and other objects are attained by the means described herein and illustrated upon the accompanying drawings, in which:

FIG. 1 is a perspective view of a gauge actuated circuit control unit embodying two electric switches or circuit controllers.

FIG. 2 is a vertical cross-section of the FIG. 1 unit.

FIG. 3 is an exploded perspective view of a switch and adjustable mounting therefor.

FIG. 4 is a side elevation of the FIG. 3 elements assembled.

FIG. 5 is a fragmental elevational view taken on line 5—5 of FIG. 2.

Figure 6:
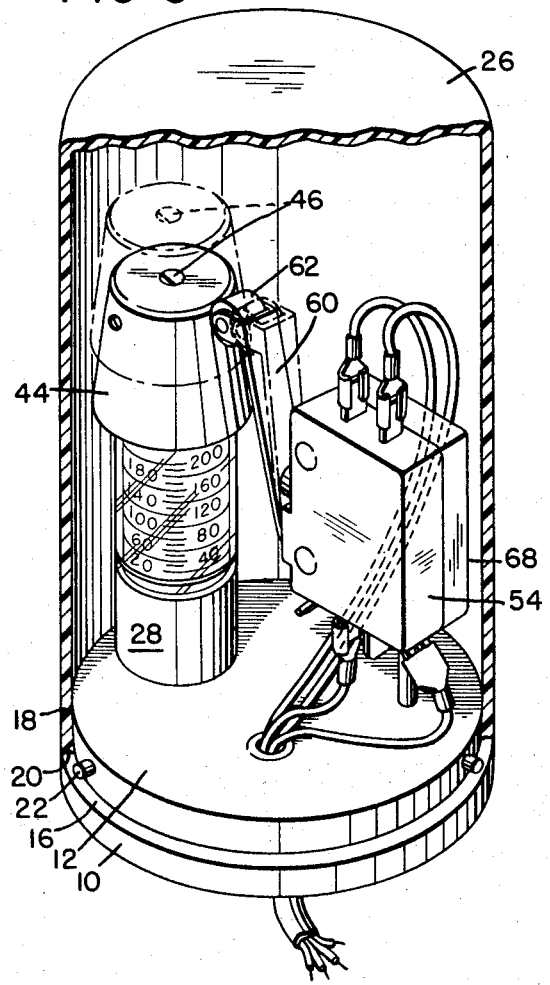
FIG. 6 is a perspective view, partly broken away, showing a modification of the FIG. 1 unit.

In the several drawings views, the reference numeral 10 indicates a base preferably though not necessarily in the form of a flat disc having upper and lower or opposite faces 12 and 14. The base may be formed of any suitable hard material. As herein shown by way of example, the base is formed of a dielectric plastic or insulating sheet material shaped as a disc and provided with a circumferential shoulder 16 to support a cover member or hood 18 defining a chamber above the base.

The cover member may be in the form of an inverted cup as shown, having a circumferential edge 20 to rest upon shoulder 16 with a close fit such as may effectively exclude dust, moisture and other foreign substances from the chamber. Any suitable means may be employed for detachably connecting the cover member to the base, as for example a pin and bayonet slot connection 22,24. The cover has a closed end wall 26.

A fluid pressure gauge 28 is mounted upon base 10 so as to project into the chamber of cover member 18. The mounting may be effected in any appropriate manner, such as by forming an aperture 30 in the base to accommodate the screw-threaded neck 32 of the gauge, which neck may be secured by the internal screw threads of an adapter 34 to clamp the gauge body upon the base 10. The adapter includes a bore 36 which conveys fluid under pressure to the interior of the gauge through hollow neck 32.

The pressure gauge includes a reciprocable transparent window element 38 through which is visible a calibrated scale 40 carried by the gauge body. The window element is reciprocatably mounted relative to the gauge body similarly to the manner in which indicating element 188 in U.S. Pat. No. 3,286,726 is reciprocatably mounted relative to gauge body 182. A circumferential indicator line 42 carried by the window element scans the scale as the window element is projected upwardly relative to the gauge body incident to entry of pressured fluid into port 36. The window element is in the form of a transparent cylinder surrounding the calibrated inner cylindrical portion of the gauge body.

For the purposes of the present invention, the window element 38 carries a control head 44 which is movable therewith between upper and lower limits of travel of the window member. The control head may be superposed upon and fixed to the window element 38 in any suitable manner, as by means of a screw or rivet 46.

Control head 44 desirably is in the form of a truncated cone or conical member having a smooth side wall or cam surface 48 tapering upwardly and inwardly toward the axis of reciprocation of the window element. The top wall 50 of the control head may be substantially flat as shown, the particular shape thereof being a matter of immateriality to the present invention. From the top wall 50 to the base edge 52 of the control head, the exposed inclined wall 48 is preferably smooth and continuous as shown.

The reference characters 54 and 56 indicate components used in controlling and conducting electric power. For example, 56 may denote a terminal block, fuse block or the like, whereas the numeral 54 may denote a switch or contactor, a circuit breaker, or other component to be actuated incident to actuation of gauge 28 by fluid pressure. Switches to be actuated may be of either the normally closed or normally open-contact type, and in many instances they may be microswitches.

The switch or other type circuit controller usually will include an actuator which is sometimes a button, or as in most instances, a lever 60 as shown. The lever is movable between operative and inoperative position as illustrated by full and broken lines in FIG. 2, to either open or close an electric circuit in which the switch is connected. The actuator may carry a small frictionless follower or roller 62 to bear upon the inclined camming surface 48 of the control head.

As FIG. 2 clearly indicates bodily movement of the conical control head 44 from the lowered or retracted position to the elevated or extended broken line position, causes the inclined surface 48 to outwardly displace the actuators or levers 60, thereby to effect actuation of the associated switches or controllers for either closing or opening the electric contacts thereof. Conversely, upon return of the control head to the lowered or retracted position, the levers or actuators 60 will be restored to the initial position, at which the contacts of the switches or controllers are returned to normal position usually by the action of springs incorporated therein.

From the foregoing, it will be understood that switches or other actuatable controllers subject to actuation by control head 44, may be responsive to both the elevating and the lowering of head 44 by the pressure gauge 28.

By reference to FIGS. 1 and 2, it is noted that one of the switch actuators 60 is disposed at a higher elevation than the other relative to base 10. The higher actuator, of course, will respond to advancement of the control head subsequently to actuation of the lower switch actuator, assuming a full advancement of the control head. If advancement of the control head normally is only partial in extent, and fails to reach the upper limit, only the lowermost switch may enjoy actuation, and the higher switch may experience actuation only as the result of an abnormal upward projection of the control head.

To achieve regulation of the time and the sequence of operation of the several switches or circuit controllers, means is provided for varying the elevation of the individual components and their actuators relative to base 10 or its face 12. Such means may take various forms of course. In the example illustrated, the base 10 may be drilled as at 64 to accommodate an upright support or post 66, and upon said post or support may be mounted a slide member 68 which may be locked at selected elevations along the length of the support. The slide member 68 provides a mount for a switch or other electrical component, which may be detachably secured thereto in any suitable manner, as by means of screws 70.

Slide member 68 may be appropriately locked at selected locations along support member 66, as by means of a set screw 72, and the support member in turn may be secured to base 10 by means of a set screw 74. By locating the components of the unit at selected elevations relative to the control head 44, the components may be caused to function according to any predetermined sequence or relationship.

Figure 7:
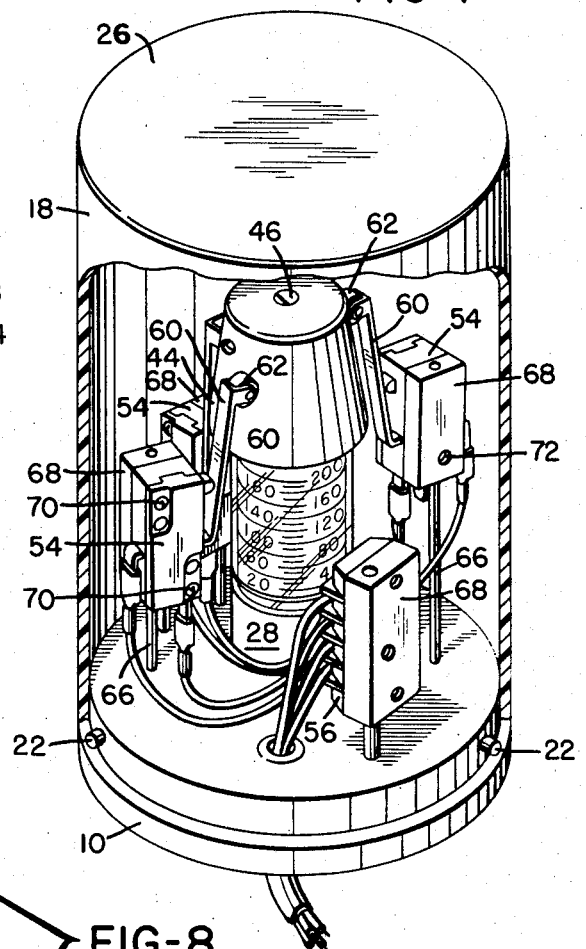
FIG. 7 is a view similar to FIG. 6, showing a second modification.

The number of components subject to actuation by movements of control head 44, is dependent upon several factors, such as the size of the components, and the diameter of the control head and the unit base 10. Under current practice, the components are available as miniatures and may therefore be incorporated in a unit which is quite small and compact. FIG. 1 exemplifies a unit having two actuatable components 54, whereas FIGS. 6 and 7 illustrate, respectively, the incorporation of one and three of such components. FIG. 7, in addition, incorporates at least one non-actuatable component 56, which by way of example may be a terminal block.

Figure 8:
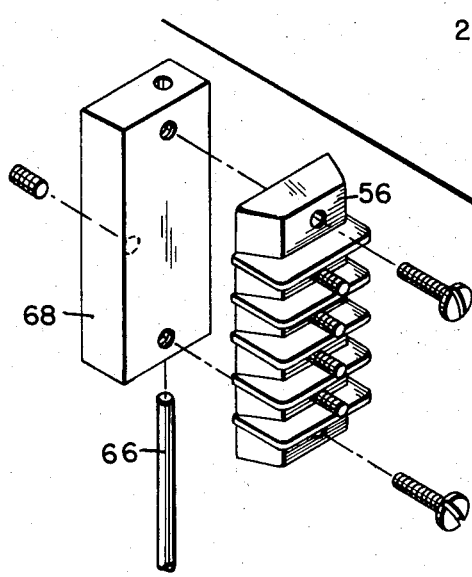
FIG. 8 is an exploded perspective view of a terminal block and adjustable mount therefor incorporated in the unit of FIG. 7.

With further reference to FIGS. 7 and 8, the component 56 being non-actuatable in character, does not necessarily require a support with adjustability features. Accordingly, such a component may be mounted upon base 10 directly, or with the use of readily available or standard mounting devices some of which are known as snap-in track-type terminal block assemblies. If desired, however, the post and slide member 66, 68 previously described may be used as support means for such components according to FIG. 8.

The cover member or hood 18 may be wholly or partly transparent so as to expose to view the gauge scale and any other unit components that require observance. Thus, the unit of FIGS. 1 and 2 is seen to include a cover member 18 whose cylindrical side wall is transparent. The top wall 26 may be either transparent or opaque. In the examples of FIGS. 6 and 7, the cover member may be opaque as shown, or if desired, transparent cover members may be substituted therefor.

It is to be understood that components of various types performing various functions may be incorporated in the unit of the present invention, whether or not the components are subject to actuation. Those components which include actuating means, such as the levers 60 or equivalent movable parts, may be clustered about the control head 44 of the pressure gauge as previously explained, to provide an efficient, economical and compact package. The unit is effectively operative in any position of use, not necessarily upright.

What is claimed is:

1. A gauge actuated circuit control unit comprising in combination: a base having upper and lower faces; a fluid pressure gauge having a body, and a reciprocative indicating element mounted for reciprocation relative to said body, said reciprocative element and said body having cooperating pressure indicative indicia thereon, movement of said reciprocative element being responsive to changes of fluid pressure within the gauge, said gauge having an inlet ported neck for entry of pressured fluid; means supporting the gauge upon the upper face of the base with the ported neck arranged for connection with a source of pressured fluid; a conical control head mounted upon the reciprocative element at the end thereof for movement therewith, said control head having an inclined conical wall or camming face; at least one electric circuit controller including a movable actuator, means mounting said controller in a normally fixed relationship to the base, with the actuator thereof in the path of movement of said camming face of the control head, whereby said control head in reciprocating moves the actuator and activates said controller and a transparent protective cover supported by said base in position to envelop the pressure gauge, its control head, and said circuit controller.

2. The combination as defined by claim 1, wherein is included a plurality of electric circuit controllers each having an actuator subject to actuation by the camming face of the control head.

3. The combination as defined by claim 2, wherein is included means for selectively varying the positions of said actuators relative to said camming face, for varying the sequence of operation of said controllers.

4. The combination as defined by claim 3, wherein said means last mentioned comprises adjustment means associated with said controller mounting means, for effecting selective positioning of the controllers at different elevations relative to a face of said base.

5. The combination as defined by claim 3, wherein said means last mentioned comprises adjustment means for the selective positioning of the controller actuators at different elevations upon the camming face of the control head.

6. The combination as defined by claim 1, wherein is included at least one non-actuatable electrical component supported in fixed relationship to said base.

7. The combination as defined by claim 1, wherein is included at least one non-actuatable electrical component supported within the confines of said cover.

8. A gauge actuated circuit control unit comprising in combination: a planar base having upper and lower faces; a fluid pressure gauge including an elongate cylindrical body carrying an external calibrated scale, and a reciprocative transparent window element cylindrically formed and concentrically surrounding the cylindrical body and said scale; said body including an inlet port for pressured fluid; means responsive to changes of fluid pressure within said body for reciprocating said window element axially of said body; means supporting the gauge in upright position upon the base, with said inlet port exposed for entry of pressured fluid from a source of supply; a conical control head mounted upon the window element for movement therewith, the axis of the conical head being coincidental with the axis of the body and the window element, said conical head having a conical wall or camming face inclined upwardly and inwardly toward the axis of reciprocation of the window element; at least one electric circuit controller including a movable actuator; and means mounting said controller in a normally fixed relationship to the base, with the actuator thereof in position to be struck and displaced laterally by contact of said camming face with said actuator as the control head moves with said window element in a direction away from said base.

9. The combination as defined by claim 8, wherein is included a plurality of electric circuit controllers each having an actuator in position to be displaced laterally by contact with a different area of the camming face.

10. The combination as defined by claim 9, wherein the several circuit controllers are disposed in a substantially circular path surrounding the upright pressure gauge.

11. The combination as define by claim 8, wherein is included means for selectively varying the elevation of individual actuators relative to a point on the axis of the conical head.

12. The combination as defined by claim 11, wherein is included a protective cover supported by said base in position to envelop the pressure gauge assembly and said circuit controllers.

13. The combination as defined by claim 11, wherein the cover is formed at least partly of a transparent material exposing to view the calibrated scale of the pressure gauge.

14. The combination as defined by claim 11, wherein the means last mentioned includes an upright post fixed upon the base, a slide member securable at selected elevations upon said post, and means for securing a circuit controller to said slide member.

15. The combination as defined by claim 14, wherein is included a protective cover circumscribing and providing a dome over substantially the entire upper face of said base.

* * * * *